(12) United States Patent
Fischer et al.

(10) Patent No.: US 10,882,599 B2
(45) Date of Patent: Jan. 5, 2021

(54) AIRCRAFT DOOR ARRANGEMENT WITH SOUND REDUCED HOLLOW SPACE WHICH CAN BE COVERED BY AN AIRCRAFT DOOR

(71) Applicant: AIRBUS OPERATIONS GMBH, Hamburg (DE)

(72) Inventors: Markus Fischer, Hamburg (DE);
Jean-Marc Hanke, Hamburg (DE);
Uwe Dittmann, Hamburg (DE);
Matthias Siercke, Hamburg (DE);
Sebastian Kagel, Hamburg (DE); Enno Houtrouw, Hamburg (DE);
Peter-Philipp Frenzel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 515 days.

(21) Appl. No.: 15/895,073

(22) Filed: Feb. 13, 2018

(65) Prior Publication Data
US 2018/0170512 A1 Jun. 21, 2018

Related U.S. Application Data

(63) Continuation of application No. PCT/EP2016/069105, filed on Aug. 11, 2016.

(30) Foreign Application Priority Data

Aug. 14, 2015 (DE) .................. 10 2015 113 471

(51) Int. Cl.
*B64C 1/14* (2006.01)
*B64C 1/40* (2006.01)

(52) U.S. Cl.
CPC .............. *B64C 1/1461* (2013.01); *B64C 1/14* (2013.01); *B64C 1/1407* (2013.01); *B64C 1/40* (2013.01); *Y02T 50/40* (2013.01)

(58) Field of Classification Search
CPC ....... B64C 1/1461; B64C 1/14; B64C 1/1407; B64C 1/40
See application file for complete search history.

(56) References Cited

U.S. PATENT DOCUMENTS

| | | | | |
|---|---|---|---|---|
| 2008/0164373 | A1* | 7/2008 | Roming | B64C 1/14 244/129.5 |
| 2011/0042517 | A1* | 2/2011 | Depeige | B64C 1/143 244/129.5 |

(Continued)

FOREIGN PATENT DOCUMENTS

| | | |
|---|---|---|
| DE | 102014107674 A1 | 12/2015 |
| WO | 2007107861 A1 | 9/2007 |
| WO | 2014198956 A1 | 12/2014 |

OTHER PUBLICATIONS

European Patent Office International Searching Authority, International Search Report for International Publication No. WO 2017/029180 A1 dated Nov. 10, 2016.

(Continued)

*Primary Examiner* — Justin M Benedik
(74) *Attorney, Agent, or Firm* — Greer, Burns & Crain, Ltd.

(57) ABSTRACT

An aircraft door arrangement includes a door, a door seal, and a door opening. The door opening has an opening edge adjoining the door opening and extending into the aircraft fuselage, at which a seal seat is arranged, which can be brought into flush contact with the door seal. A hollow space, partially covered by the edge region of the door, is formed by the door seal, the seal seat, and the opening edge. A gap (located between the door and the door opening when the aircraft door is closed) is connected with the hollow space. A sound reducing profile is arranged at the opening edge in the hollow space, and it includes a sound reflecting surface oriented oblique with respect to a surface of the door, which (Continued)

is adjacent to the gap. The sound reflecting surface at least partially follows the course of the gap.

13 Claims, 3 Drawing Sheets

(56) References Cited

U.S. PATENT DOCUMENTS

| | | | | |
|---|---|---|---|---|
| 2012/0267475 A1* | 10/2012 | Campos | ............... | B64C 1/40 244/1 N |
| 2014/0345199 A1* | 11/2014 | Yahata | ............... | B64C 1/14 49/475.1 |
| 2015/0210374 A1* | 7/2015 | Poppe | ............... | B64C 1/1461 49/477.1 |

OTHER PUBLICATIONS

The German Patent and Trademark Office, Publication for German Patent Application No. DE102015113471A1 dated Feb. 16, 2017.

* cited by examiner

AIRCRAFT DOOR ARRANGEMENT WITH SOUND REDUCED HOLLOW SPACE WHICH CAN BE COVERED BY AN AIRCRAFT DOOR

CROSS-REFERENCE TO PRIORITY APPLICATIONS

This application is a continuation of international patent application number PCT/EP2016/069105, having an international filing date of Aug. 11, 2016, which claims priority to German patent application number DE 102015113471.3, having a filing date of Aug. 14, 2015. The content of the referenced applications is incorporated by reference herein.

TECHNICAL FIELD

Embodiments of the invention relate to an aircraft door arrangement with a hollow space which can be covered by an aircraft door and at least one sound reducing profile body arranged in the hollow space and to an aircraft with a fuselage, a door opening arranged therein and an aircraft door arrangement assigned to the door opening.

BACKGROUND

Doors for closing an opening of a fuselage of a commercial aircraft typically include a reinforced, areal component which is designed such that the door preferably forms an even, continuous (step less) surface with the outer surface of the fuselage in the closed state of the door. The structure used for reinforcement extensively extends along the inner surface of the door and is inspired in its formation by a fuselage structure and comprises stringer and cross-bracing elements which are connected to the outer skin.

An edge region extending close to the outer edge of the inner surface of the door is provided with a door seal which seals the interior of the fuselage with respect to the surrounding if the door is closed. Typically, the door seal directly rests on the inner surface of the areal component and has a sealing profile which is vaulted and supported by supporting profiles. In the closed state of the door, the sealing profile clings to a corresponding sealing surface in or at the door opening and is thereby compressed to a flush sealing. A hollow space is created between an opening contour, an outer edge of the door, the sealing profile and the seal seat, in which hollow space flow-induced resonance effects may arise. Often, the hollow space may be considered a "deep hollow space" which has a low width in the profile cross section in comparison to the direction of extension of the gap.

United States patent publication number 2012/0267475 A1 describes an acoustic sealing arrangement which extends along a gap in an aircraft door arrangement, which acoustic sealing arrangement fills a hollow space being formed between the aircraft door and a frame located at a door opening and includes a sound reducing material as to reduce wind noises.

BRIEF SUMMARY

It may be understood as an object of the disclosure to propose an aircraft door at which flow-induced resonance effects may be reduced or completely eliminated without having to make modifications to the seal or, generally, to the door structure.

This object is solved by an aircraft door arrangement with the features of the independent claim 1. Advantageous embodiments and improvements can be taken from the dependent claims and the following description.

An aircraft door arrangement for an aircraft fuselage is proposed, the aircraft door arrangement comprising an aircraft door, at least one door seal arranged at an inner side of the aircraft door and extending circumferentially in an edge region of the aircraft door and a door opening closable by the aircraft door which door opening has an opening edge adjoining to the opening and extending to the interior of the aircraft fuselage at which opening edge a seal seat is arranged which can be brought into a flush contact with the door seal. A hollow space is formed by the door seal, the seal seat and the opening edge, which hollow space may at least partially be covered by the aircraft door. A gap is connected with the hollow space, which gap is located between the aircraft door and the door opening if the aircraft door is closed. One substantial feature is that at least one sound reducing profile is arranged at the opening edge in the hollow space, which sound reducing profile comprises at least one planar surface section which is oriented oblique with respect to a surface of the aircraft door which surface is adjacent to the gap, wherein the surface section at least partially follows the course of the gap.

The air within the hollow space which is fluidically connected to the surrounding via the gap may be excited to vibrations by flowing. A perceivable noise which is to be dampened arises depending on the size of the gap, the size and orientation of the gap, the presence of a step between the aircraft door and the edge region of the door opening. Integration of at least one sound reducing profile according to the abovementioned implementation may result in a substantial reduction of the noise without any modification of the aircraft door or of a region around a door opening. The at least one planar surface section which is arranged in the hollow space oblique with respect to the direction of extension of the sound waves influences the direction of propagation and the reflection of the sound waves in the hollow space in such a manner that the noise generation is reduced. For example, the at least one planar surface section may reflect impinging sound waves in a direction facing away from the gap, as a consequence of which the sound waves may diminish in the hollow space. Multiple reflection which occurs in the hollow space may result in multiple change of direction which converts the kinetic energy of the sound waves into other forms of energy and, hence, reduces noise generation. However, depending on the material selection, contour design and orientation, the at least one planar surface section may also interfere with the sound propagation in another manner, like sound absorption, sound transmission or sound dissipation.

Here, the sound reducing profiles are preferably elongated, stripe-like bodies which have a certain uniform profile cross section or, if desired, a profile cross section varying along its circumference and which can be adhered or inserted along the opening edge which typically is freely available. Hence, the sound reducing profile is very easy to be inserted into already existing aircraft door arrangements and provides a very good retrofit solution for considerable sound reduction. Modifications are not required.

If the door provides enough space between its edge and the door seal, the arrangement of the sound reducing profiles may also be located at the door on the opening edge and may extend along the opening edge, wherein this location information is to be understood when the door is closed.

In an advantageous embodiment, multiple sound reducing profiles which are adjacent to each other are arranged in the hollow space. Here, an adjacent arrangement refers to the arrangement of multiple sound reducing profiles in the hollow space, which sound reducing profiles follow upon one another from the gap in a direction towards a center of the door. Consequently, the entire planar surface section which can be provided thereby is large, or, depending on the number of the used sound reducing profiles, very large in comparison to a single sound reducing profile and the sound reduction may be further improved as a result of this. Depending on the type of the used material of the sound reducing profile, the additional weight is small or negligible. A preferred combination results from four sound reducing profiles.

Of the adjacent sound reducing profiles there are at least two sound reducing profiles adjacent directly to each other and do not have any distance to each other. Consequently, two or more planar surface sections follow directly one after another and may form a step-like structure. The sound reduction achieved thereby is considerably improved due to the greater area.

For achieving the inventive advantages, it is preferred that the planar surface section is at an angle in a range from 5° to 60° with respect to the surface of the aircraft door, which surface is adjacent to the gap. This surface is to be considered as the outer skin surface of the aircraft fuselage or of the door which directly adjoins the gap.

Additionally, the basis may also have an angle in a range from 5° to 60° with respect to the surface of the aircraft door adjacent to the gap. Preferably, this angle falls short of the previously mentioned angle of the planar surface section so that a mandrel-like profile cross section is the result. At least in an ending region, this may additionally be bent in a direction facing towards the gap.

The individual height of the single sound reducing profiles may be adapted to the geometry of the hollow space so that these may have different heights. The maximum extension of each of the single sound reducing profiles from the opening edge in direction towards the door seal, i.e., the length of the single "spikes" of the sound reducing profile, may increase with increasing distance from the gap. Thus, each of multiple planar surface sections following one after another may reflect a part of the sound waves which propagate in the hollow space and which are directed to the single planar surfaces and collectively contribute to a sound reflection. A region further protruding to the door seal is covered by each planar surface section due to the increasing extension, wherein the individual sections which belong to the sound reducing profiles may also overlap each other.

The width of a sound reducing profile which width is measured cross to the outer surface in an edge region of the door opening, i.e., from the gap in a direction towards the interior of the fuselage, is dependent from the angle of the planar surface section and the extension of the sound reducing profile towards the door seal. If only one section of the sound reducing profile, which section is close to the door seal, is equipped with a planar surface section, the width may be chosen relatively small which may result in increasing the possible number of sound reducing profiles. On the other hand, the entire extension of the sound reducing profile which faces towards the door seal may be used for arranging the planar surface section so that the individual planar surface sections are designed greatest possible, wherein this may increase the required widths of the sound reducing profiles. It may be considered to be advantageous to design an arrangement of sound reducing profiles, which sound reducing profiles are adjacent to each other, such that the arrangement extends along at least half of the depth of the hollow space, which depth is measured starting from the gap to an opposite end of the hollow space.

The maximum extension of the at least one sound reducing profile from the opening edge towards the door seal may be chosen such that the door seal is not touched reliably, while at the same time with at least one of the sound reducing profiles a greatest possible extension towards the door seal and, thus, a greatest possible planar surface section is ensured. The achievable width of a sound reducing profile measured in this direction may be about in a range which includes 75% to 95% and preferably 90% to 95% of the available local clear span of a surface in the hollow space suitable for the integration of a sound reducing profile.

The at least one sound reducing profile may be made of a hydrophobic and temperature-resistant material which results in an adequate form stability. Especially suitable is silicone, an elastomer or another rubber-like material.

The at least one sound reducing profile may be made of a foam material which preferably is open-celled, but nevertheless may be sufficiently dimensionally stable. Due to the open-celled design, a sound absorption may take place additionally to the sound reflection which results in conversion of the kinetic energy of the sound waves into other forms of energy as soon as the foam material is passed. As a matter of course, the foam material may also be close-celled which positively influence the dimensional stability. Manufacturing of a foam material results in an advantageously low weight as a majority of the volume is filled by a gas.

It is furthermore conceivable that the sound reducing profile alternatively includes an extruded plastic which in particular simplifies the fabrication considerably. Such a plastic may comprise dimensionally stable, rigid plastics as well as supple and rubber-like plastics. Alternatively, using of materials on the basis of natural origin, as for example rubber, is also possible.

The sound reducing profile may further additionally comprise a layer of a carrier material which differs from the main material of the sound reducing profile. The carrier material may be adapted for connection of the sound reducing profile, while a region carrying the planar surface section may be adapted to the sound characteristics.

In case multiple sound reducing profiles are used side by side, these may also be fabricated as a single part in the form of a single and continuous stripe. This facilitates the attachment of the sound reducing profiles considerably as a separate positioning of sound reducing profiles which are spaced apart from each other is omitted.

For ease of attachment it makes sense that the at least one sound reducing profile comprises an adhesive or mechanical connection device or element which is tolerant with respect to the environmental influences, i.e., changes in pressure, a wide temperature range, humidity and fuselage deformations. For example, a self-adhesive support area may be provided, alternatively also pin connections, screw connections, rivet connections may be used or an adhesive based, for example, on a suitable resin may be applied as to thereby fasten the sound reducing profile.

The disclosure further relates to an aircraft comprising an aircraft fuselage with at least one previously described aircraft door arrangement. The sound reducing profile may follow at least a majority of the course of the gap along lateral sections of the aircraft door which progress vertical to a flight direction, at which lateral section the noise generation is at its maximum due to the flight direction progressing perpendicular thereto. Especially advantageously, the sound reducing profile is affixed from an upper to a lower door radius, wherein this may include the door radius at least in part.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and application possibilities of the present disclosure can be derived from the following description of exemplary embodiments and the drawings. Thereby, all described and/or visually depicted features for themselves and in any combination form the subject matter of the disclosure independent of their combination in the individual claims or their dependencies. In the drawings, same reference signs indicate same or similar objects.

DETAILED DESCRIPTION

Figure 1:
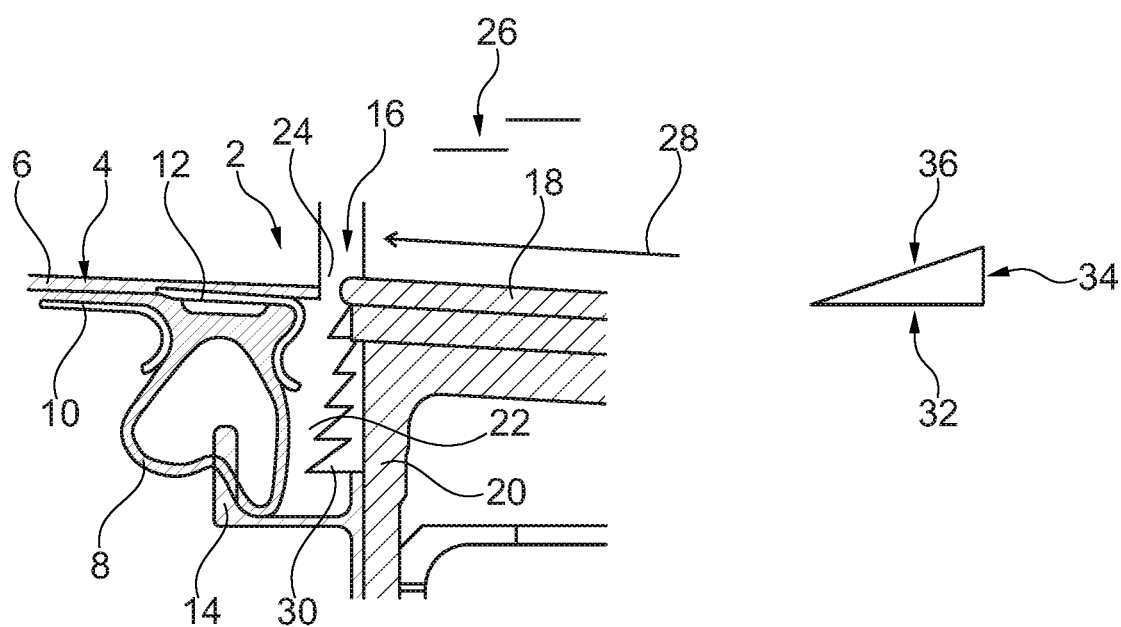
FIG. 1 shows a sectional view of an exemplary aircraft door arrangement.
Figure 2:
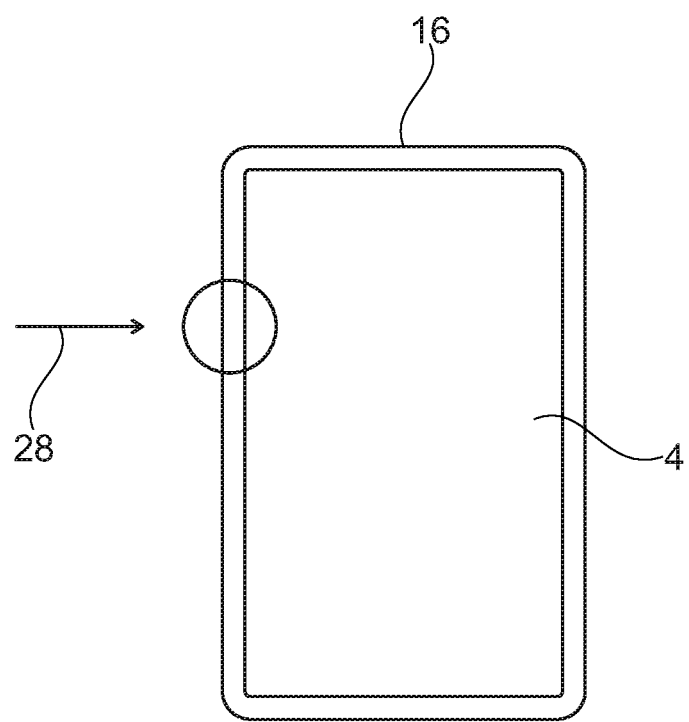
FIG. 2 shows an aircraft door with a section position marked therein.

In FIG. 1, a section through a lateral door sealing region of an aircraft door arrangement 2 is shown. Exemplarily, a section surface can be seen which is oriented vertically upwards, that is, in negative Z-direction of a coordinate system defined with respect to the aircraft. For clarification, the location and the section direction are shown in FIG. 2.

The aircraft door arrangement 2 comprises an aircraft door 4 which comprises an areal reinforced component 6 that has a vaulted, compressible sealing profile 8 which is held in a predefined shape by retaining plates 10 and 12. The sealing profile 8 extends from the door component 6 inwardly in a direction towards the interior of the fuselage which is arranged at a side of the sealing profile 8 which faces away from the reinforced component 6 at least in the closed state of the door 4. In a closed state of the door 4, the sealing profile 8 is pressed onto a seal seat 14 as to cause a sealing effect there. Then, the door 4 closes a door opening 16 as flush as possible as to provide an outer surface at an aircraft fuselage 18 as harmonic as possible.

Due to the design, in the closed state a hollow space 22 is formed between the seal seat 14, the sealing profile 8, the contours of the opening 16 and one or more reinforcement components 20 of the fuselage 18 which protrude towards the sealing profile 8, which hollow space is in fluidic connection with the surrounding via a gap 24 between the door component 6 and contours of the opening 16. Due to fabrication tolerances, thermal expansion effects and the like, a step 26 may be present between the door component 6 and the adjacent surface of the fuselage 18. During flight, air flows with a relatively high speed exemplarily in a direction indicated by the arrow 28 via the gap 24 or the step 26 so that resonance effects and, thus, noises caused thereby arise. This may, in particular, be noticed at a lateral boundary of the door as there a direct overflow of the gap 24 or the step 26 happens perpendicular to its extension. Depending on the dimension of the hollow space 22 and the profiling of the opening 20 as well as of the door component 6, tonal noises may arise every now and then, which in the worst case perceivably extend into the passenger cabin of the aircraft via structure-born sound.

The type and, in particular, the frequency of the tonal noise may be determined in part by the general shape of the hollow space 22. In the shown case, the extension of the hollow space along the direction of flow 28 is substantially lower than perpendicular thereto, i.e., in direction of the seal seat 14. The hollow space 22 is to be considered as a "deep" hollow space 22 in this exemplary embodiment.

For reducing or completely eliminating this noise, multiple sound reducing profiles 30 are arranged side by side and following the extension of the gap 24, wherein the sound reducing profiles are arranged at a side of the structural component 20 facing towards the sealing profile 8, and which sound reducing profiles exemplarily have a triangular cross section. The cross section comprises a basis 32, respectively, which is exemplarily arranged parallel to the gap 24 or to the surface of the door 4 or of the fuselage 18 adjacent to the gap 24 or parallel to the direction of flow 28. Thereto, a support area 34 is adjoined, which support area is about perpendicularly extending in this example and which support area is connected to the structural component 20 by adhesion, for example. A planar surface section 36 extends between the basis 32 and the support area 34, which surface section extends oblique at an angle a with respect to the local direction of extension of the door component 6 or the adjoining surface of the fuselage 18. It is the aim of this forming that the propagation of pressure waves is disrupted, which pressure waves move through the gap 24 into the hollow space 22 and are obliquely reflected at the planar surface sections 36 with respect to the initial direction of propagation. Thus, the feedback and, as a consequence, resonance conditions are impaired.

It may make sense to choose a larger extension of the structural component 20 into the hollow space 22 with increasing distance from the gap 24. Specifically, with the arrangement of multiple sound reducing profiles 30 side by side this means that these evolve from a relatively small extension of the basis 32 directly below the gap 24 to a considerably enlarged extension of the basis 32 at an opposite end of the hollow space 22.

The width of the individual sound reducing profiles 30, that is the longitudinal extension of the support area 34 along the structural component 20 in the sectional view, may be the same at all sound reducing profiles 30 so that the angle a of each planar surface section 36 may decrease with increasing distance from the gap 24. However, this is not necessary, alternatively also a uniform angle may be chosen so that the extension of the support area 34 in the sectional view is enlarged with increasing sound reducing profile 30 or so that the planar surface section 36 is offset towards the sealing profile 8.

Further alternatively, an increasing angle may also be considered, by means of which the size of the support area 34 may be steadily increased or the planar surface section 36 comprises an increasing offset with respect to the sealing profile 8.

For further improvement of the sound insulation properties, single or all basal planes 32 may likewise extend angularly with respect to the surface of the door 4 or of the fuselage 18, which surface adjoins the gap 24 or with respect to the direction of flow 28 resulting in a mandrel-like shape of the sound reducing profiles formed thereby.

FIG. 2 shows a schematic representation of the aircraft door 4 and the opening 16 as well as exemplarily the position where the sectional view shown in FIG. 1 originates from. As the gap 24 is overflown cross almost exclusively at lateral surfaces of the aircraft door 4, integration of the sound reducing profiles 30 is suitable in particular there.

Figure 3:
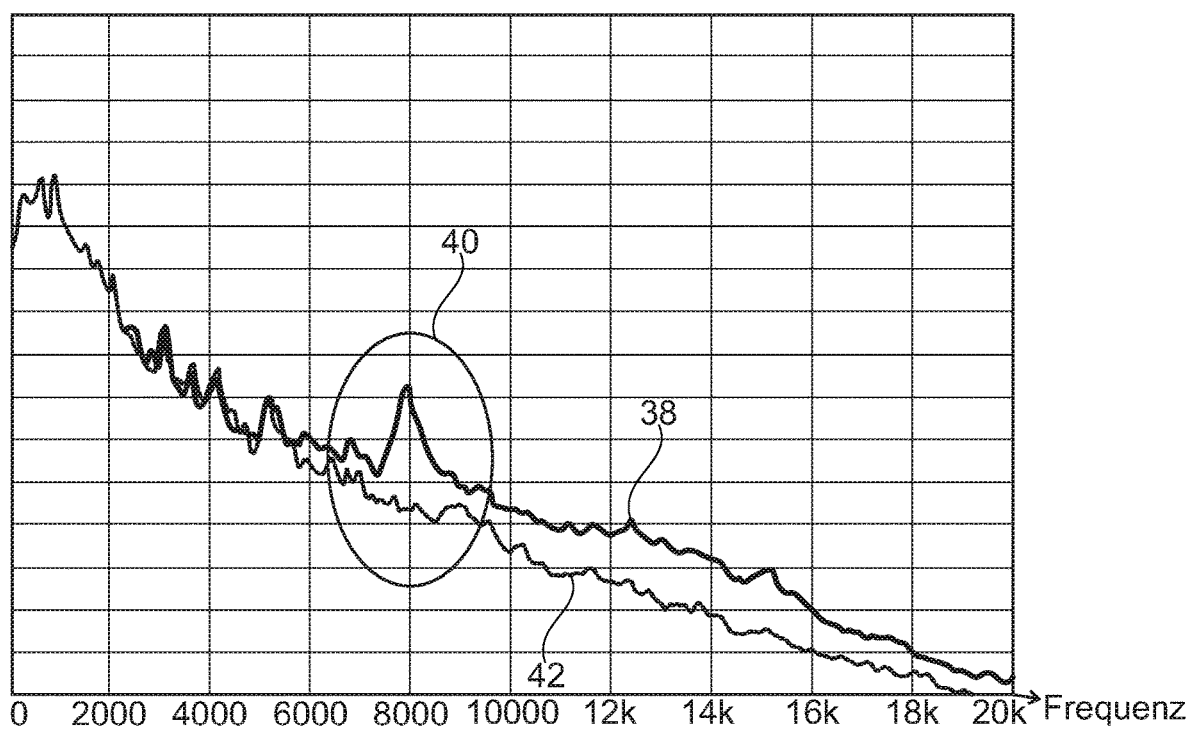
FIG. 3 shows an exemplary noise spectrum with a reduction of a tonal noise.

FIG. 3 exemplarily shows a noise spectrum from which the sound pressure can be read on the vertical axis and the frequency can be read on the horizontal axis. An upper curve 38 represents an unchanged noise spectrum without usage of sound reducing profiles 30, which upper curve in particular comprises a relatively discrete tonal noise in a marked region 40. In particular, the frequency is dependent from the design of the hollow space 22 here. In a lower curve 42 set below, the noise damped by using the disclosed sound reducing profiles 30 is shown, at which noise also the initial tonal share is missing.

Additionally, it is noted that "comprising" does not exclude any other elements and "a" or "an" does not exclude a plurality. It is further noted that features which are described with reference to one of the above exemplary embodiments may also be used in combination with other features of other exemplary embodiments described above. Reference signs in the claims are not to be construed as a limitation.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft door arrangement for an aircraft fuselage, comprising:
    an aircraft door;
    a door seal arranged at an inner surface of the aircraft door and circumferentially extending in an edge region of the aircraft door; and
    a door opening closable by the aircraft door, the door opening having an opening edge adjoining thereto and extending into an interior of the aircraft fuselage, at which opening edge a seal seat is arranged which can be brought into a flush contact with the door seal;
    wherein a hollow space is formed by the door seal, the seal seat and the opening edge, which hollow space is at least partially covered by the edge region of the aircraft door;
    wherein a gap is connected with the hollow space when the aircraft door is closed, which gap is located between the aircraft door and the door opening; and
    wherein a sound reducing profile is arranged at the opening edge in the hollow space, which sound reducing profile comprises a planar surface section which is oriented oblique with respect to a surface of the aircraft door which surface is adjacent to the gap, wherein the planar surface section at least partially follows the course of the gap.

2. The aircraft door arrangement according to claim 1, wherein multiple sound reducing profiles are arranged in the hollow space adjacent to each other.

3. The aircraft door arrangement according to claim 2, wherein at least two sound reducing profiles are adjacent directly to each other, do not have a distance to each other, and are made as one piece.

4. The aircraft door arrangement according to claim 1, wherein the planar surface section has an angle in a range from 5° to 60° with respect to the surface of the aircraft door being adjacent to the gap.

5. The aircraft door arrangement according to claim 1, wherein a basis of the sound reducing profile, which basis is arranged at a side of the sound reducing profile, which side faces away from the gap, has an angle in a range from 5° to 60° with respect to the surface of the aircraft door, which surface is adjacent to the gap.

6. The aircraft door arrangement according to claim 2, wherein the respective maximum extension of each of the single sound reducing profiles increases in a direction from the opening edge towards the door seal with increasing distance from the gap.

7. The aircraft door arrangement according to claim 1, wherein the maximum extension of the sound reducing profile from the opening edge towards the door seal is such that the door seal is not touched by the sound reducing profile in a closed state.

8. The aircraft door arrangement according to claim 1, wherein the sound reducing profile is made of a hydrophobic material.

9. The aircraft door arrangement according to claim 1, wherein the sound reducing profile comprises silicone, an elastomer, or a rubber-like material.

10. The aircraft door arrangement according to claim 1, wherein the sound reducing profile comprises a layer of a carrier material.

11. The aircraft door arrangement according to claim 1, wherein the sound reducing profile comprises an adhesive or mechanical connector to fasten the sound reducing profile.

12. An aircraft comprising:
    an aircraft fuselage; and
    an aircraft door arrangement comprising:
        an aircraft door;
        at least one door seal arranged at an inner surface of the aircraft door and circumferentially extending in an edge region of the aircraft door; and
        a door opening closable by the aircraft door which door opening has an opening edge adjoining thereto and extending into an interior of the aircraft fuselage, at which opening edge a seal seat is arranged which can be brought into a flush contact with the door seal;
    wherein a hollow space is formed by the door seal, the seal seat and the opening edge, which hollow space is at least partially covered by the edge region of the aircraft door;
    wherein a gap is connected with the hollow space when the aircraft door is closed, which gap is located between the aircraft door and the door opening; and
    wherein a sound reducing profile is arranged at the opening edge in the hollow space, which sound reducing profile comprises at least one planar surface section which is oriented oblique with respect to a surface of the aircraft door which surface is adjacent to the gap, wherein the planar surface section at least partially follows the course of the gap.

13. The aircraft according to claim 12, wherein the sound reducing profile follows at least a majority of the course of the gap at lateral regions of the aircraft door which extend vertically to a direction of flight.

* * * * *